(12) United States Patent
Bailey et al.

(10) Patent No.: US 7,653,785 B2
(45) Date of Patent: Jan. 26, 2010

(54) RECONFIGURABLE CACHE CONTROLLER UTILIZING MULTIPLE ASIC SRAMS

(75) Inventors: James Ray Bailey, Georgetown, KY (US); Zachary Nathan Fister, Lexington, KY (US); Joseph Kamal Yackzan, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 130 days.

(21) Appl. No.: 11/158,596

(22) Filed: Jun. 22, 2005

(65) Prior Publication Data

US 2006/0294308 A1 Dec. 28, 2006

(51) Int. Cl.
*G06F 12/00* (2006.01)
*G06F 13/00* (2006.01)
*G06F 13/28* (2006.01)

(52) U.S. Cl. .................................... 711/118
(58) Field of Classification Search .................. 711/118
See application file for complete search history.

(56) References Cited

U.S. PATENT DOCUMENTS

| | | | |
|---|---|---|---|
| 5,195,089 A * | 3/1993 | Sindhu et al. ............. 370/235 |
| 5,276,832 A | 1/1994 | Holman, Jr. |
| 5,509,132 A | 4/1996 | Matsuda et al. |
| 5,586,293 A * | 12/1996 | Baron et al. ............. 711/118 |
| 5,835,941 A | 11/1998 | Pawlowski |
| 5,915,049 A | 6/1999 | Kaji et al. |
| 5,956,744 A | 9/1999 | Robertson et al. |
| 6,029,224 A | 2/2000 | Asthana et al. |
| 6,108,450 A | 8/2000 | Ueda |
| 6,266,784 B1 * | 7/2001 | Hsiao et al. ............. 714/6 |
| 6,314,494 B1 * | 11/2001 | Keltcher et al. ............. 711/137 |
| 6,321,318 B1 * | 11/2001 | Baltz et al. ............. 711/170 |
| 6,446,181 B1 * | 9/2002 | Ramagopal et al. ............. 711/168 |
| 6,515,759 B1 * | 2/2003 | Smith ............. 358/1.15 |
| 6,678,790 B1 * | 1/2004 | Kumar ............. 711/118 |
| 6,684,298 B1 | 1/2004 | Dwarkadas et al. |
| 6,745,290 B2 | 6/2004 | Ohba |
| 6,751,704 B2 | 6/2004 | Ng |
| 6,801,982 B2 | 10/2004 | Borkenhagen et al. |
| 2001/0021959 A1 | 9/2001 | Holmberg et al. |
| 2001/0023475 A1 | 9/2001 | Pawlowski |
| 2002/0073280 A1 | 6/2002 | Ng |
| 2002/0112120 A1 | 8/2002 | Franz et al. |
| 2002/0196484 A1 | 12/2002 | Chang |
| 2003/0140195 A1 | 7/2003 | Borkenhagen et al. |
| 2003/0217228 A1 | 11/2003 | Ohba |
| 2004/0205295 A1 * | 10/2004 | O'Connor et al. ............. 711/129 |
| 2004/0205296 A1 * | 10/2004 | Bearden ............. 711/129 |
| 2004/0215881 A1 | 10/2004 | Ohba |
| 2006/0085597 A1 * | 4/2006 | McNeill ............. 711/118 |
| 2006/0277365 A1 * | 12/2006 | Pong ............. 711/128 |

FOREIGN PATENT DOCUMENTS

WO    WO 99/60480 A1    11/1999

* cited by examiner

*Primary Examiner*—Matt Kim
*Assistant Examiner*—Matthew R Chrzanowski (57) ABSTRACT

An application specific integrated circuit (ASIC) is configured to perform image processing tasks on a printer or other multi-function device. The ASIC includes a processor, a dedicated cache memory, a cache controller and additional Static Random Access Memory (SRAM) normally employed in image processing tasks. This additional SRAM may be dynamically allocated as a cache memory when not otherwise occupied.

24 Claims, 11 Drawing Sheets

RECONFIGURABLE CACHE CONTROLLER UTILIZING MULTIPLE ASIC SRAMS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to SRAMs on board an ASIC. More particularly, it relates to such SRAMs that may be dynamically used as a cache memory, and a cache controller therefore. The present invention may be especially suitable for use with an embedded processor such as those commonly used is printers, all-in-one units, or other devices that perform operations on image data.

2. Description of the Related Art

Multifunctional devices such as a printer/scanner/copier, other all-in-one devices, or the like, are commonplace. As is known to those skilled in the art, such devices generally have a scanner bar which either moves relative to an original document, or is stationary as the original document passes by. These devices also have a printing assembly for forming an image on a substrate, mechanical devices to feed the substrate, original documents, scanner bar, ink supply and the like.

Figure 1:
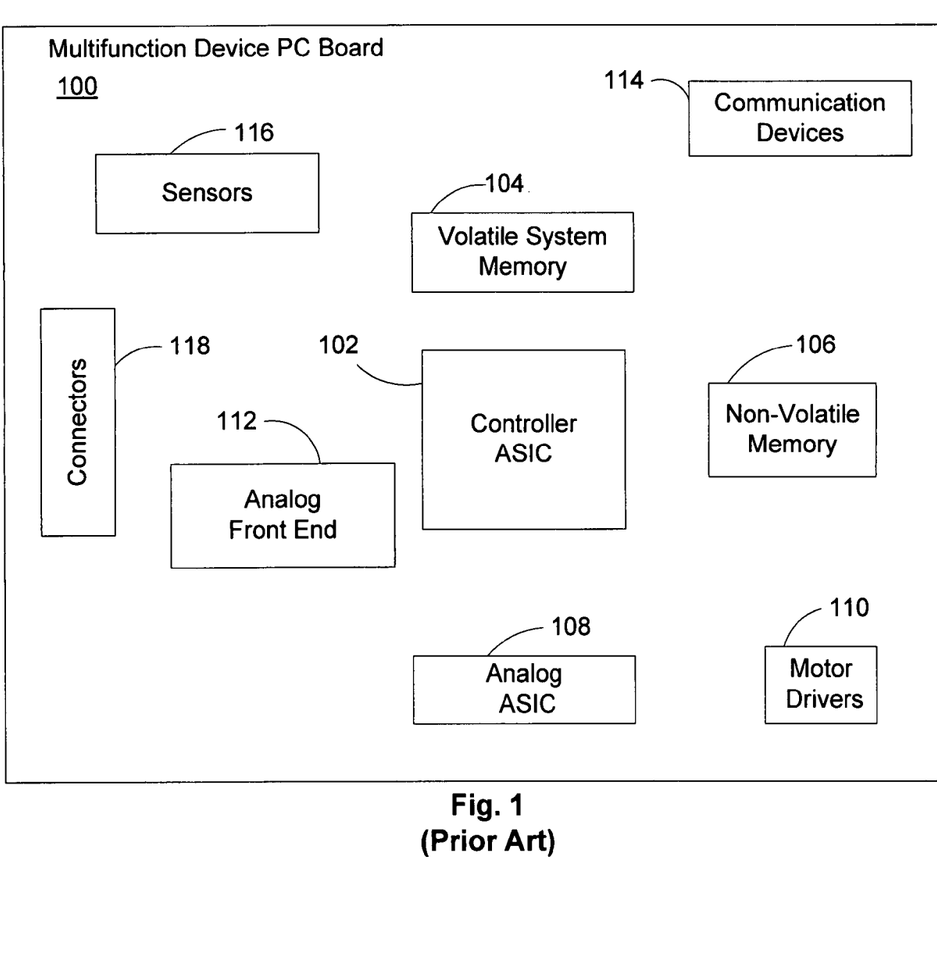
FIG. 1 shows the layout of a prior art PC Board of the type used in a multifunction device, such as an all-in-one printer.

Typically, such multifunction devices have a printed circuit board (PCB) carrying a number of components to control various operations. FIG. 1 shows a layout of a typical PCB 100 of the sort used in such a device. It is understood that the wiring, bus lines, etc. have been omitted from this figure. The PCB 100 carries a number of components, and some of the more important of these are briefly discussed.

First and foremost, the PCB 100 carries an application specific integrated circuit (ASIC) 102 which provides the majority of the control (both in hardware and firmware) for the multifunctional device. The controller ASIC 102 typically contains mostly digital logic. It is understood that the controller ASIC 102 may be a single chip, as shown in FIG. 1, or may be implemented as a chip set.

The controller ASIC 102 communicates with a number of other components resident on the PCB. These include a volatile system memory 104, a non-volatile memory 106, an analog ASIC 108, motor driver circuitry 110, analog front end 112, communication devices 114, sensors 116 and connectors 118. It is understood that there may be one or more of each of these, as needed.

The volatile system memory 104 is used to store and retrieve processor instructions and data. This memory is also used by any custom hardware assistance to store data such as image data. The non-volatile memory 106 (SFLASH, NVRAM, etc.) is used to store the firmware base (compiled microprocessor code plus any extra data needed to run the device) so that on power-up, processor code can be transferred from the slow non-volatile memory to 106 the fast volatile system memory 104. From the fast volatile system memory, the processor will execute its code base.

The analog ASIC 108 typically contains the analog circuitry necessary to deliver the appropriate voltage levels to the components on the PCB 100 (e.g. 5V, 3.3V, 1.8V). This ASIC 108 may also contain motor drivers and other analog electronics needed by the device.

The motor driver circuitry 110, which may be implemented as one or more special ASICs or comprised of discrete components (e.g. transistors, resistors, etc), converts digital control signals to speed and position control signals for the motors of the multifunction device.

The analog front end 112 (AFE) is used to convert the analog signals from the scanner bar to digital signals for use in the controller ASIC. This chip provides image data from a scanner to the controller ASIC.

The miscellaneous communication devices 114 may provide a means of communication to and from other devices such as a personal computer (PC), card readers, digital cameras, etc. These devices may simply be connectors or may contain discrete components such as ASICs and other components.

The sensors 116 may be present to detect things such as open covers, media position, and the like.

The connectors 118 are present to connect the PCB to other pieces of the device such as the motors, op-panel, scanner bar, printheads, etc.

Other components not shown such as resistors, capacitors, inductors, voltage regulators, etc. are typically located on the PCB 100 and serve a variety of functions to complete the electronics for the PCB 100.

The controller ASIC 102 for a multifunction device is charged with a number of tasks. Included among these are image processing operations, such as for rendering an image line by line. To increase performance for such memory-intensive tasks, the ASIC 102 may be provided with a sizable onboard static random access memory (SRAM) and may also be provided with a cache memory for quick access to instructions and/or data that otherwise may reside in volatile memory 104.

Generally speaking, a cache is a memory that is typically only accessible by the processor and is used to store a certain number of recently accessed data words. The number of data words that may be stored is determined by the size of the cache memory. A cache may improve processor throughput by allowing the processor to retrieve data without waiting for the typically longer access latency of the main memory. Also, main memory may be shared by other system functions, such as a Direct Memory Access (DMA) controller, and the cache allows the processor to retrieve data without waiting for another function to relinquish control of main memory.

A cache is typically divided into multiple word segments with a base address maintained for each section by the control logic. The amount of control logic needed to store the base addresses increases as the number of sections increases. The cache control logic compares the address of an incoming memory request to the stored base addresses and a match is considered a cache hit, while no match is considered a cache miss. In the event of a cache hit, the cache advantage is realized because the cache controller recognizes the address as one from a previous access and can retrieve the requested information from the cache memory quickly. In the event of a cache miss, the cache controller replaces a section of the cache memory with a new section of data from main memory. The most common replacement schemes utilized by cache controllers are replacement of the least recently used or the least frequently used section. Ideally, cache hits will occur multiple times for the same addresses and the cache will provide a performance advantage, as compared to a system that uses no cache.

In an ASIC having an internal processor, a cache may be implemented with fast access memories such as Synchronous Random Access Memories (SRAMs). The cache memory is typically bundled with and only accessible by the processor for the sole purpose of caching instructions or data. Larger cache memories typically translate to increased performance at the cost of increased die area and increased ASIC price.

Figure 2:
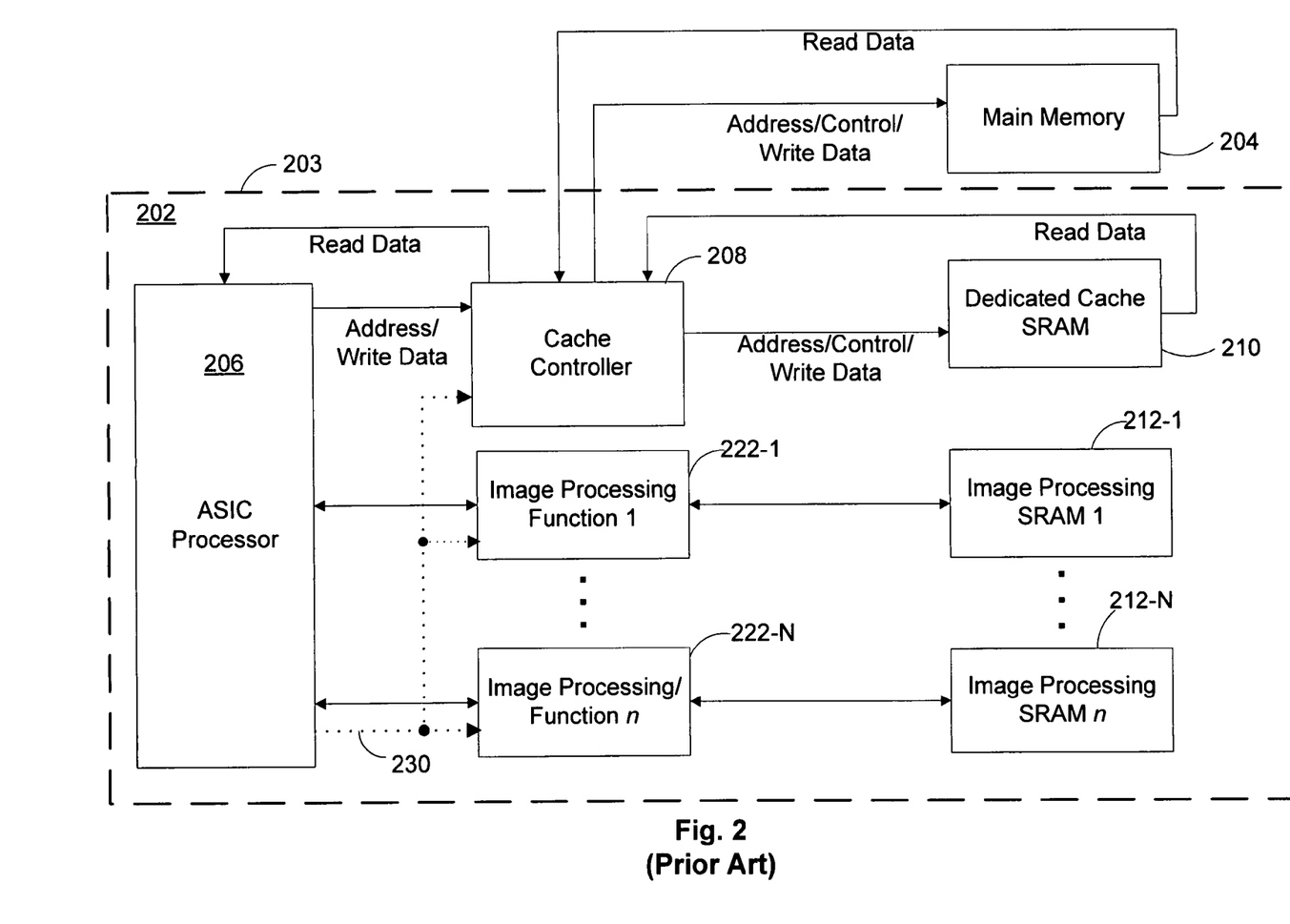
FIG. 2 shows a conventional prior art controller ASIC of the sort that may be used on the PC Board of FIG. 1.

FIG. 2 shows a number of components belonging to conventional controller ASIC 202 for a multifunction device. The dashed 203 line separates the controller ASIC 202 from the remainder of the PCB 100 and the solid lines between the various components illustrate information flow, rather than discrete physical connections. The dotted line 230 denotes control and other signaling from a processor 206 to the other circuitry. This control may be implemented by Advanced Microprocessor Bus Architecture (AMBA) protocols. The conventional controller ASIC 202 includes the processor 206, a cache controller 208 and a dedicated cache SRAM 210. Upon receiving an address from the processor, the cache controller 208 determines whether the dedicated cache 210 has the required information. If there is a cache hit, the requested information is retrieved from the dedicated cache 210; if not, the cache controller retrieves the requested information from main memory 204, along with adjacent information in accordance with the cache protocol.

The conventional controller ASIC 202 also includes a plurality of image processing modules 222-1, 222-N which perform specific tasks and directly communicate with the processor 206. Each of these modules 222-1, 224-N has an associated task-specific SRAM 212-1, 212-N, respectively. In general, these task-specific SRAMs 212-1, 212-N are physically located adjacent to their respective modules 222-1, 222-N and are not contiguous with one another, or with other memory on the ASIC, such as the dedicated cache memory 210. Furthermore, it is understood that while only two such modules and SRAMs are shown, that there may instead be other numbers of these, such as 1, 3, 4, or even more. As seen in the prior art embodiment of FIG. 2, the image processing modules 222-1, 222-N are the only entities that may read to or write from the task-specific SRAMs 212-1, 212-N, respectively. Significantly, the cache controller 208 of the conventional controller ASIC 202, which has a dedicated cache 210, does not directly write to or read from the task-specific SRAMs 212-1, 212-N as cache memories.

Prior art systems having memories that can be reconfigured are known in the art. An example of such as memory can be found in U.S. Pat. No. 6,678,790, whose contents are incorporated by reference.

SUMMARY OF THE INVENTION

In one aspect, the present invention is directed to an application specific integrated circuit (ASIC) comprising a processor; a first module configured to perform a first task when the first module is active; a first task-specific memory that in normal operation is used only by said first module to help perform said first task; and a cache controller connected to said first task-specific memory and configured to employ the first task-specific memory as the processor's cache memory, when said first module is not active.

Such an application specific integrated circuit may further comprise a second module configured to perform a second task when the second module is active; and a second task-specific memory that in normal operation is used only by said second module to help perform said second task; wherein the cache controller is connected to said second task-specific memory and is further configured to employ the second task-specific memory as the processor's cache memory, when said first module is active and the second module is not active.

In another aspect, the present invention is directed to an application specific integrated circuit comprising: a processor; a first dedicated cache memory accessible solely by the processor and usable only as a cache memory by that processor, the first dedicated cache memory having a first size; a first task-specific memory having a second size larger than the first size; and a cache controller connected to both the first dedicated cache memory and to the first task-specific memory, wherein the first task-specific memory is reconfigurable as a cache memory when said first task-specific memory is not otherwise occupied so that the processor has access to a cache memory having a size larger than that of the dedicated cache memory.

Such an application specific integrated circuit may further comprise a second task-specific memory having a third size larger than the first size, wherein the second task-specific memory is reconfigurable as a cache memory when said first task-specific memory is otherwise occupied and said second task-specific memory is not otherwise occupied, so that the processor has access to a cache memory having a size larger than that of the dedicated cache memory.

In yet another aspect, the present invention is directed to a method of designating a current cache memory in an application specific integrated circuit (ASIC) that has a dedicated cache memory, a first task-specific memory and a second task-specific memory, both the first and second task-specific memories having a size larger than that of the dedicated cache memory with the first task-specific memory having a size larger than a size of the second task-specific memory. The method comprises determining whether the first task-specific memory is occupied; if the first task-specific memory is not occupied: enabling the first task-specific memory to serve as the current cache memory; if the first task-specific memory is occupied: determining whether the second task-specific memory is occupied; if the second task-specific memory is not occupied: enabling the second task-specific memory to serve as the current cache memory; and if the second task-specific memory is occupied: enabling the dedicated cache memory to serve as the current cache memory.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

The term output as used herein encompasses output from any printing device such as color copier, color printers, and so-called color "all-in-one devices" that incorporate multiple functions such as scanning, copying, and printing capabilities in one device. Such printing devices may utilize ink jet, dot matrix, dye sublimation, laser, and any other suitable print formats. The term button as used herein means any component, whether a physical component or graphic user interface icon, that is engaged to initiate output.

Figure 3:
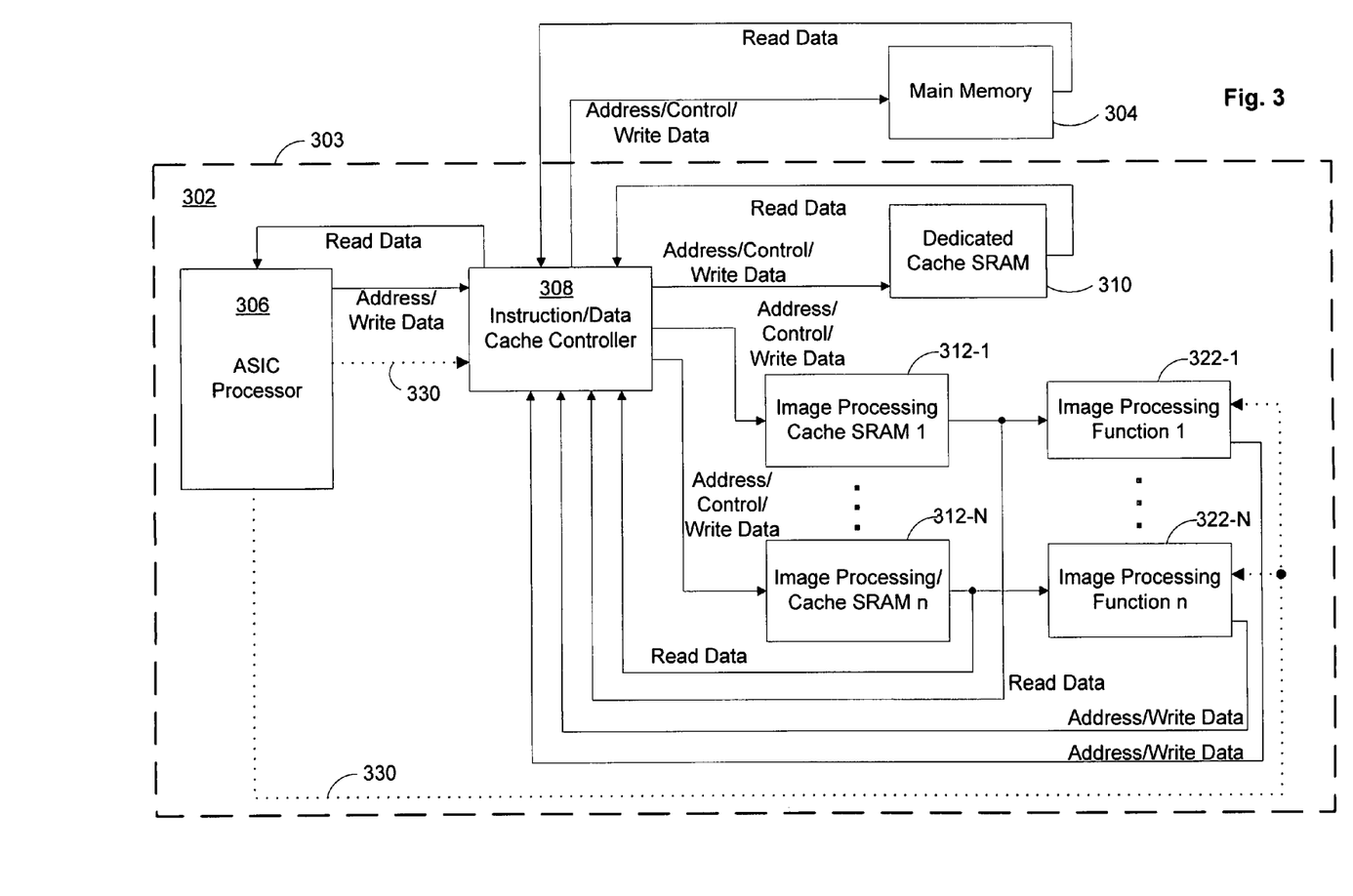
FIG. 3 shows a controller ASIC in accordance with the present invention.

FIG. 3 shows an ASIC 302 in accordance with the present invention. The ASIC 302 includes a processor 306, a cache controller 308, a dedicated cache SRAM 310, and a plurality of task-specific SRAMs 312-1, 312-N which in normal use are used exclusively by corresponding image processing modules 322-1, 322-N. Furthermore, the first task-specific memory 312, the second task-specific memory 312-N and the dedicated cache memory 310 are all mutually non-contiguous, i.e., no two or more of these are contiguous. Finally, a main memory 304 onboard the PCB is accessed by the cache controller 308, as needed.

Just as in FIG. 2, in FIG. 3, the solid lines between the various components illustrate information flow, the dashed line 303 separates the controller ASIC 302 from the remainder of the PCB, and the dotted lines 330 indicate a processor control interface for setting up and programming each module in the system. However, in FIG. 3, the lines representing information flow directly between the processor 306, and the task-specific SRAMs 312-1, 312-N and the image processing module have been omitted for sake of convenience. It is understood, however, that such information flow may still occur.

As represented in FIG. 3, the cache controller 308 may be either an instruction cache controller or a data cache controller. In either case, multiple task-specific SRAMs can be used by the cache controller, including task-specific SRAMs that traditionally are assigned to specific modules having particular functions. During processor 306 operations, if caching is enabled, instructions and/or data can come from either one or more task-specific SRAMs 312-1, 312-N, from a dedicated cache SRAM 301, or from main memory 304. All multiplexing among the various memories is performed within the cache controller 308, as described below with respect to FIG. 4a.

Thus, in the embodiment of FIG. 3, the ASIC 302 is configured such that at least one or more task-specific SRAMs 312-1, 312-N may be used as cache memories, when they are not otherwise occupied. This enhances processor performance because the task-specific SRAMS 312-1, 312-N, which are normally used for image processing, typically are larger than the dedicated cache SRAM 310. Using a larger cache to store instructions and/or data reduces latency in processor operations. In one embodiment, the SRAMs 312-1, 312-N are of different sizes, and so, when both are available, the preference is to use the larger of the two as the active cache memory. Without loss of generality, for present purposes, we will assume that first SRAM 312-1 is larger than second SRAM 312-N. It is also understood that in one embodiment, the task-specific SRAMs 312-1, 312-N may comprise physically distinct circuitry placed on different locations on the ASIC die, though in another embodiment the task-specific SRAMs 312-1, 312-N are contiguous.

Figure 4A:
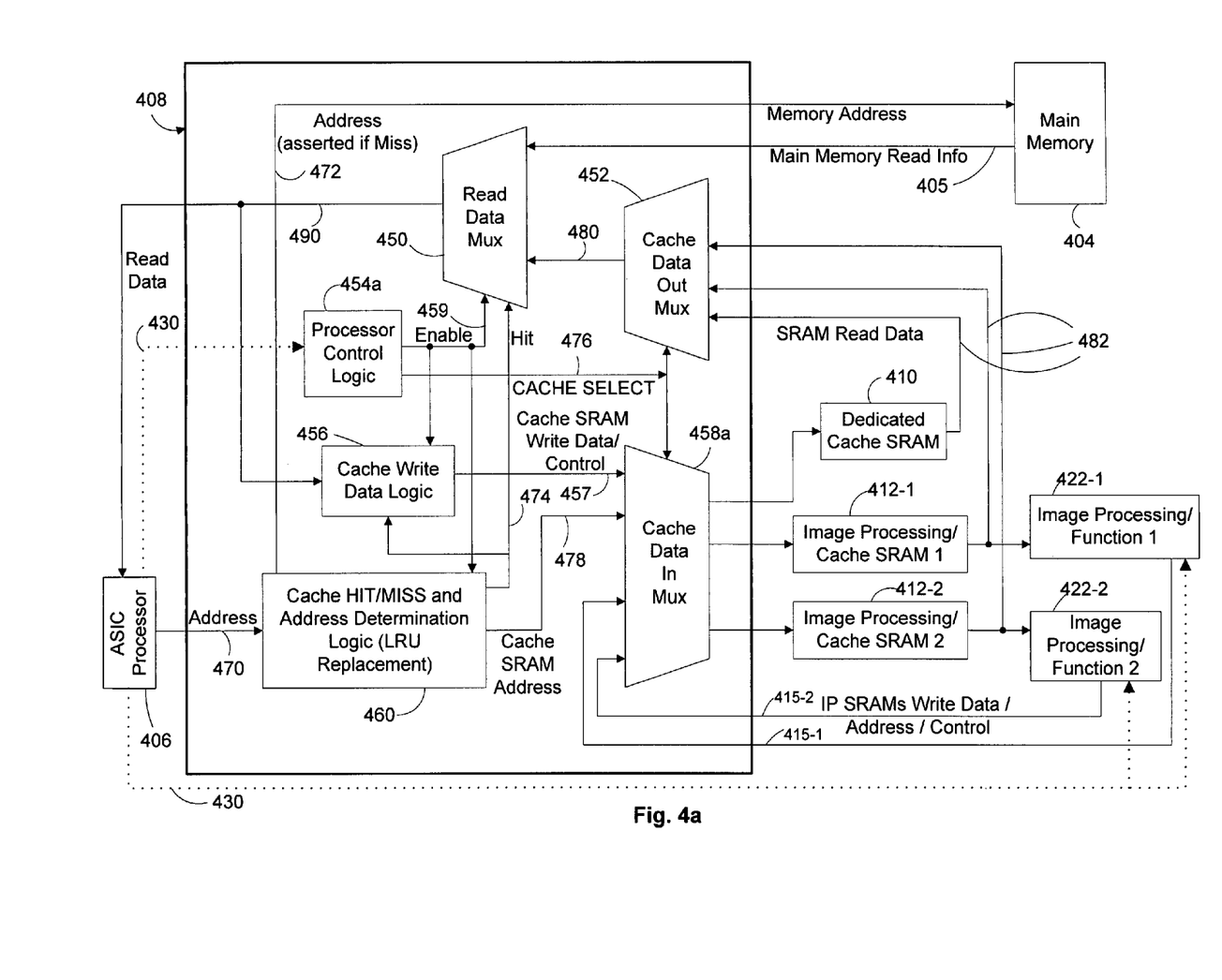
FIG. 4a shows a block diagram of the cache controller of FIG. 3.

FIG. 4a shows a block diagram of an embodiment of an ASIC having an instruction cache controller 408 that is consistent with cache controller 308. The dotted line 430 denotes control and other signaling from a processor 406 to the other circuitry. In FIG. 4a, the instruction cache controller 408 is shown in the context of an ASIC having a dedicated instruction cache 410, and exactly two task-specific SRAMs 412-1, 412-2 associated with their corresponding image processing modules 422-1, 422-2. A processor 406 and main memory 404 are also shown as communicating with the instruction cache controller 408. In one embodiment, the dedicated instruction cache SRAM 410 is no greater than ⅛ the size of the smaller of the two task-specific SRAMs and is closer to about 1/19 its size.

The instruction cache controller 408 includes cache HIT/MISS and address determination circuitry 460. Circuitry 460 receives main memory addresses from the processor 406 to fetch instructions, determines whether the information stored at those addresses in main memory 404 is locally available in a cache, and sends out a cache HIT/MISS signal 474 in response thereto.

In the embodiment of FIG. 4a, the CACHE SELECT signal 476 chooses between SRAMs. Preferably, the task-specific SRAMs 412-1, 412-2 are capable of writing or reading instructions on a single clock cycle. Thus, if the ASIC processor 406 uses 32-bit instructions, then the SRAMs can either be a single port SRAM of at least 32-bit word length or a dual port SRAM of 16-bit word length.

As seen from the foregoing description, firmware dynamically can change which SRAM is being used as the cache memory in a single clock cycle. If only one of the image processing task-specific SRAMs 412-1, 412-2 is needed for its regular image processing function, then the cache controller 408 can be configured to use the other SRAM 412-2, 412-1 as the cache memory. Once the first image processing function is completed, the configuration can be quickly changed by firmware so that the first SRAM 412-1 is used as the cache memory and the second SRAM 412-2 is allowed to complete its image processing function. For the case where both image processing SRAMs are being used at the same time for a particular task, the dedicated cache SRAM 410 is always available and still provides some performance improvement over a design with no cache at all.

The operation of the cache controller 408 of FIG. 4a is now described with reference to both a cache miss and to a cache hit. Both begin with the processor 406 asserting an address 470 which is input to the cache HIT/MISS circuitry 460.

In the case of a miss, the HIT/MISS circuitry 460 detects a miss, meaning that the information associated with that address is not in the cache (whichever SRAM 410, 412-1, 412-2 happens to be the current cache). In one embodiment, this is detected by using the upper n bits of the address and searching within a tag array table in the circuitry 460 to determine a match. The upper n bits of the address, which are referred to as the "tag", are used to identify the cache contents. A "miss" means that no tag in the tag array matched the tag of the asserted address. The address 472 is then asserted to main memory 404, and main memory read information 405 is retrieved and sent to the processor 406 as the read information 490 via Read Data Mux 450. The Read Data Mux 450 receives a "HIT=0" select line signal 474 from the circuitry 460, indicating that there was no cache hit and the main memory read information 405 is to be passed on as the read information 490. The read information 490 is also used by the Cache Write Data Logic circuitry 456 to send the information ("write information") 457 to be written to the Cache Data In Mux 458a. Based on the CACHE SELECT signal 476, write information will be written to the current cache 410, 412-1 or 412-2. Image processing modules 422-1, 422-2 provide data, address and control information via buses 415-1, 415-2, respectively, between said modules and Cache Data In Mux 458a when their corresponding SRAMs 412-1, 412-2, respectively, are not being used as Cache memory. Based on the replacement logic, the information already present in the current cache for a selected section will be overwritten, thus eliminating previously cached information for that section. The replacement scheme may be based on a "least recently used", "least frequently used" or other paradigm. Finally, the tag array is updated to reflect the new contents of the cache, and any flags in the replacement logic are updated as well.

In the case of a hit, the HIT/MISS circuitry 460 detects a hit, meaning that the information associated with that address is in the cache. Again, in one embodiment, this is detected by using the upper n bits of the address and searching within the tag array table in the circuitry 460 to determine a match. A "hit" means that a tag in the tag array matched the tag of the asserted address. The original address is then translated into a cache address 478 by the circuitry 460. The CACHE SELECT signal 476 selects which SRAM 410, 412-1, 412-2 is the current cache to be driven by the cache address 478. The cache read information 480 goes through the Cache Data Out Mux 452 (the CACHE SELECT signal 476 determining which one of the buses 482 are connected through so that its contents become the cache read information 480). The cache read information 480 is then passed through the Read Data Mux 450 based on the assertion of the HIT signal 474 which indicates that the cached information is the read information 490 which is then presented to the processor 406. Finally, the replacement logic is updated, flags are modified as needed, and in the case of a least recently used (LRU) replacement strategy, the tag associated with the most recently retrieved address is designated as the most recently used tag.

Figure 6:
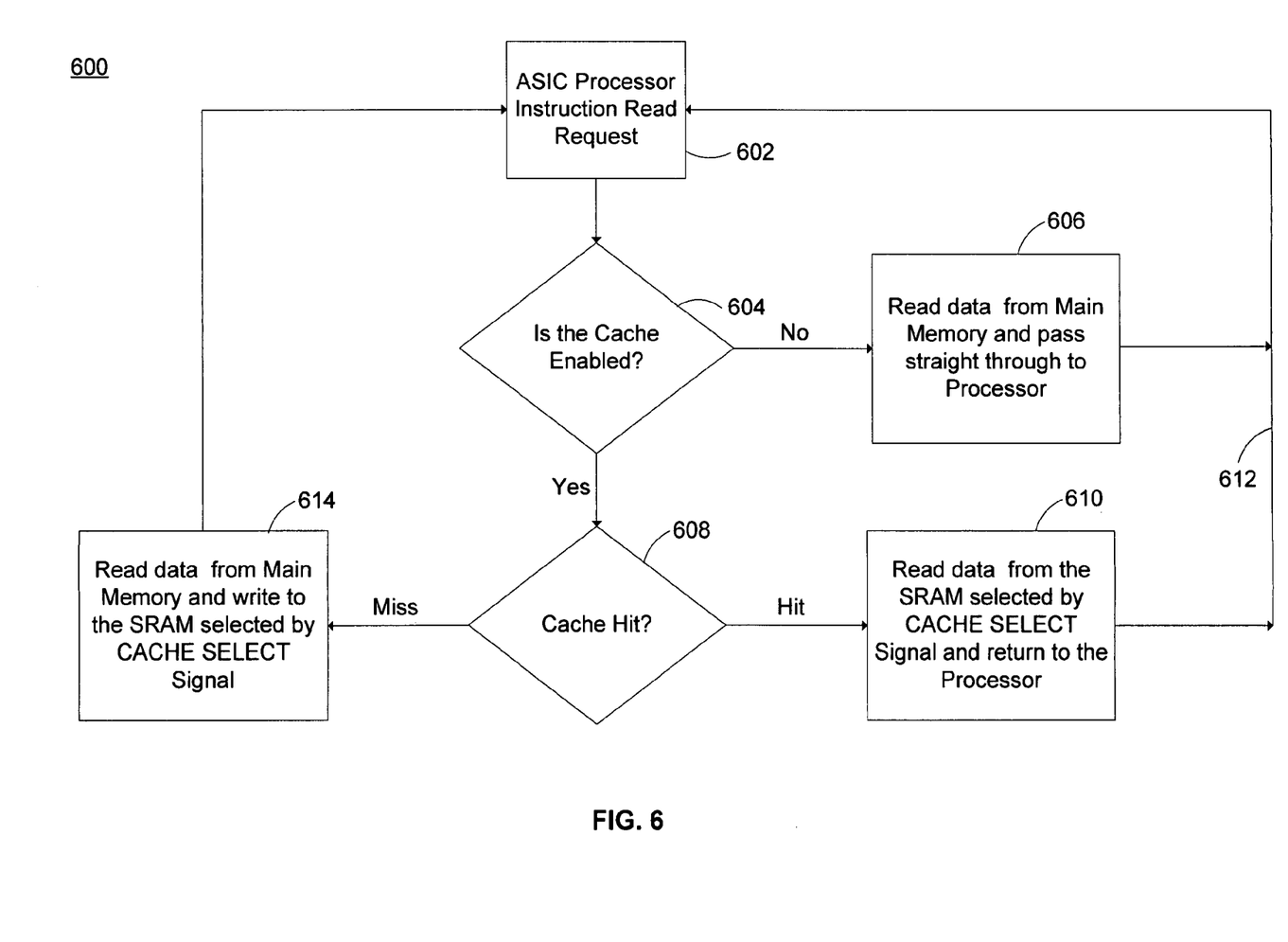
FIG. 6 shows a flow chart depicting the handling of a memory address request when the system of FIG. 4 is configured as an instruction cache.

FIG. 6 shows an exemplary protocol for the embodiment of FIG. 4a for handling read requests when one of the three SRAMs 410, 412-1, 412-2 is used as an instruction cache.

In step 602, the processor 406 executes an instruction read request and at step 604, it is determined (i.e., a flag is consulted) whether caching has been enabled. If caching has not been enabled, then in step 606, the cache controller 408 reads information directly from main memory 404 and this information is passed directly though the cache controller 408 to the processor 406 via the Read Data Mux 450.

If at step 604 it is determined that caching has been enabled, then at step 608 the cache HIT/MISS circuitry 460 checks whether there is a cache hit. If there is a cache hit, then in step 610, the information is read from the SRAM 410, 412-1, 412-2 that serves as the current cache, as determined by the CACHE SELECT signal 476, and this information is returned to the processor 406 via the Cache Data Out Mux 452 and the Read Data Mux 450. It is understood that memory entries in a selected section of the designated SRAM are overwritten in accordance with a predetermined update protocol. Thus, the information retrieved from main memory 404 and written to cache in that selected section typically will include at least some information following that at the specified address in memory 404.

If, however, at step 608 it is determined that there is a cache miss, then information is read from main memory 404. This time, however, the retrieved information is written to the appropriate SRAM 410, 412-1, 412-2 by means of the Cache Write Data Logic Circuitry 456 enabled by the Enable signal 459 from Processor Control Logic 454a and the Cache SRAM Write Data/Control signal 457 input to the Cache Data In Mux 458a, as directed by the CACHE SELECT signal 476 and the processor control logic 454a.

Figure 7:
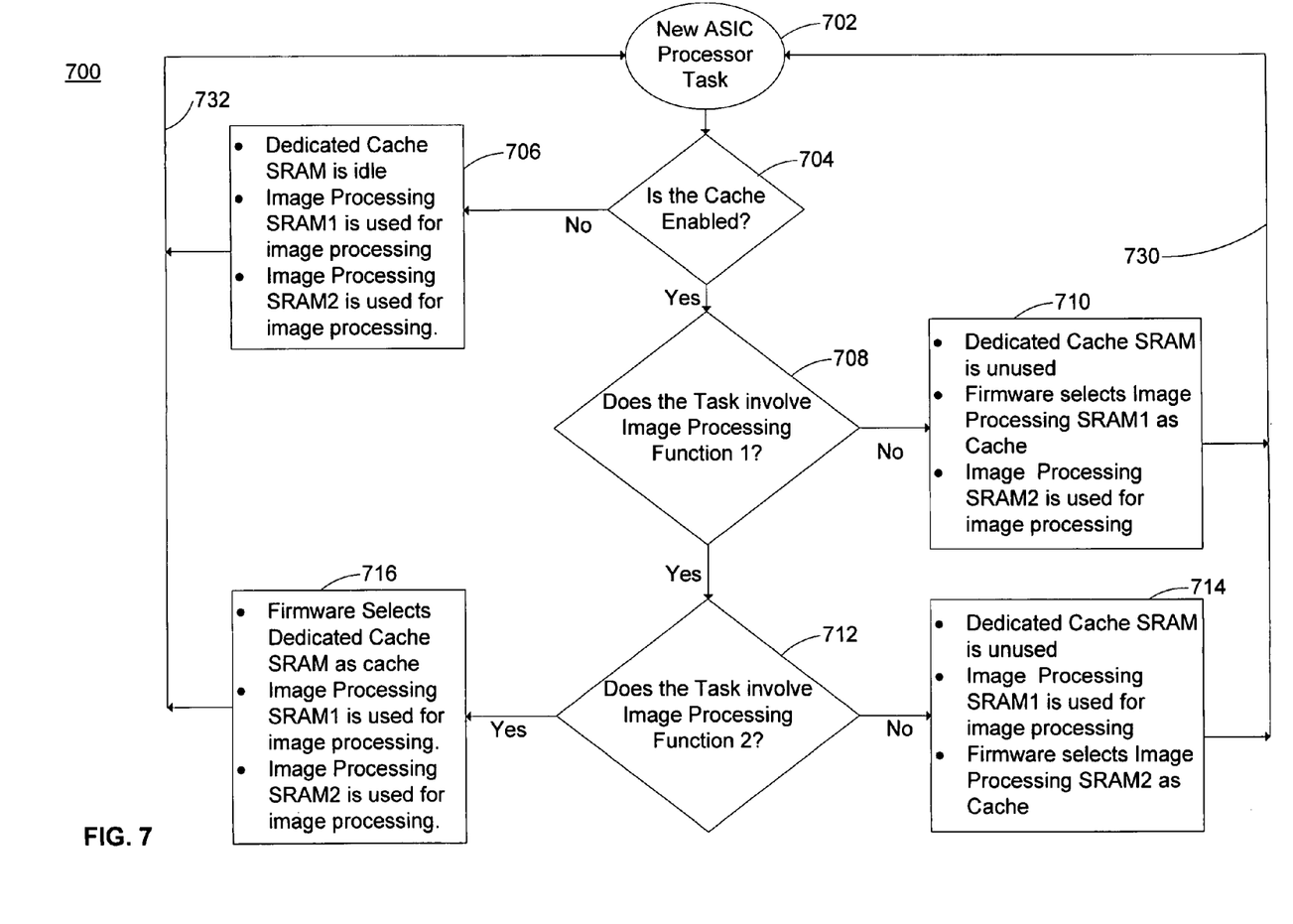
FIG. 7 shows a flow chart depicting the allocation of cache memory for a new processor task, in accordance with the present invention.

FIG. 7 shows a process for allocating cache SRAM resources when a new processor task is initiated in the situation where there is a dedicated cache SRAM and two task-specific SRAMs, such as in the embodiment of FIG. 4a. In step 702, the new processor task commences.

At step 704, a determination is made as to whether the caching is enabled at all. If caching is not enabled, then the processor enters the state depicted in box 706: the dedicated cache SRAM 410 is idle, and task-specific SRAMs 412-1, 412-2 are left alone for image processing (or other) tasks, and the cache allocation system returns 732 to await the next processor task. If, at step 704, it is determined that caching is enabled, then control goes to step 708.

In step 708, given that caching is enabled, a check is made to determine whether the task involves the first image processing function (and thus, the first image processing module including first SRAM 412-1). If not, the system enters the state shown in step 710: the dedicated cache SRAM 410 is unused, first SRAM 412-1 is selected by the firmware to serve as the cache memory, and second SRAM 412-2 is left alone for image processing (or other) tasks, and cache allocation system returns 730 to await the next processor task. If, on the other hand, it is determined at step 708 that the task does involve the first image processing function, then control goes to step 712.

In step 712, a check is made to determine whether the task involves the second image processing function (and thus, the second image processing module including second SRAM 412-2). If not, the system enters the state shown in step 714: the dedicated cache SRAM 410 is unused, first SRAM 412-1 is left alone for image processing (or other) tasks and second SRAM 412-2 is selected by the firmware to serve as the cache memory, and the cache allocation system returns 730 to await the next processor task.

If, on the other hand, it is determined at step 712 that the task does involve the second image processing function, then the system enters the state shown in step 716: the firmware selects the dedicated cache SRAM 410, and first SRAM 412-1 and second SRAM 412-2 are both left alone for image processing (or other) tasks, and the cache allocation system returns 732 to await the next processor task.

In each of the foregoing instances in which the cache is enabled and a particular SRAM is allocated to a new task, appropriate flags are set in the cache controller 408 to keep track of which SRAM is the current cache, (i.e., is active) and which are disabled. This information will be used to produce a CACHE SELECT signal 476 within the cache controller 408 for use in the various multiplexers to appropriately direct read requests, update the appropriate cache and the like.

As discussed above, first SRAM 412-1 is larger than second SRAM 412-2 which, in turn, is larger than dedicated cache SRAM 410. Therefore, the cache allocation system depicted in FIG. 7 attempts to provide the largest available cache for a new processor task: first SRAM 412-1 is checked first, then second SRAM 412-2 is checked, and only if both of these are being used, is the dedicated cache 410 used.

Figure 8:
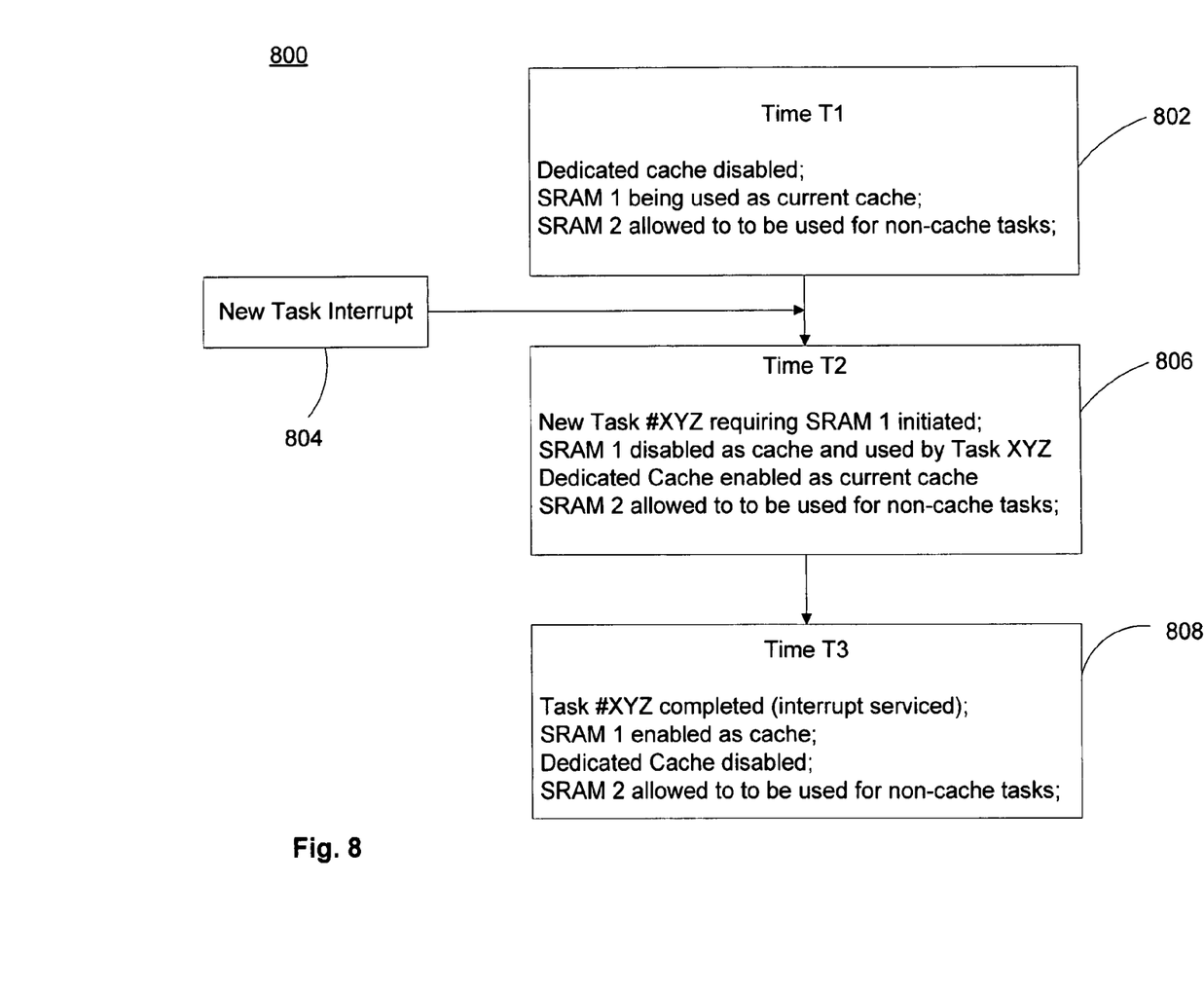
FIG. 8 shows the effect of an interrupting task that requires a task-specific SRAM that had been previously allocated for use as the current cache.

FIG. 8 shows the effects of a new process 800 requiring a task-specific SRAM that is currently being used as a cache. As shown in state box 802, at time TI, the dedicated cache 410 is disabled and idle, the first SRAM 412-1 is being used as the current cache pursuant to the cache allocation process discussed with respect to FIG. 7, and the second SRAM 412-2 is left alone for image processing (or other) tasks.

A new task 804 requiring first SRAM 412-1 interrupts the processor 406. This necessitates that the first SRAM 412-1 be relieved of its caching duties. Thus, as shown in state box 806, the new task #XYZ is initiated; the first SRAM 412-1 is disabled as a cache and released for use by the new task; the dedicated cache 410 is enabled and serves as the current cache, while the second SRAM 412-2 continues to operate as before.

When the new task #XYZ is completed, as shown in state box 808, the first SRAM 412-1 is free to be used as the current cache once again and so is enabled as the cache. In addition, the dedicated cache 410 is disabled while the second SRAM 412-2 continues to operate as before. Thus, the system enables the first SRAM 412-1 to serve as the current cache when the first SRAM 412-1 is no longer occupied.

From the foregoing, it can be seen that the regular duties of the task-specific SRAMs 412-1, 412-2 take priority over being used as a cache. When both of the task-specific SRAMs 412-1, 412-2 are occupied performing an image processing function, the processor cache function for the SRAMs is disabled; the processor must either use the dedicated cache 410 (assuming caching is enabled) or go out to main memory 404. This means that the image processing information in the SRAMs need not be temporarily stored and the corresponding image processing functions suspended. It can also be seen from the foregoing that the processor 406 and cache controller 408 can relinquish a task-specific SRAM 412-1, 412-2 "on the fly" whenever a task-specific SRAM is needed for its regular duty.

Firmware functions control turning on/off the SRAMs and so in the embodiment of FIG. 4a can also keep track of when the cache controller can use a certain SRAM and set up the appropriate settings. Various internal flags may be set or reset, as needed, to effect this.

Figure 4B:
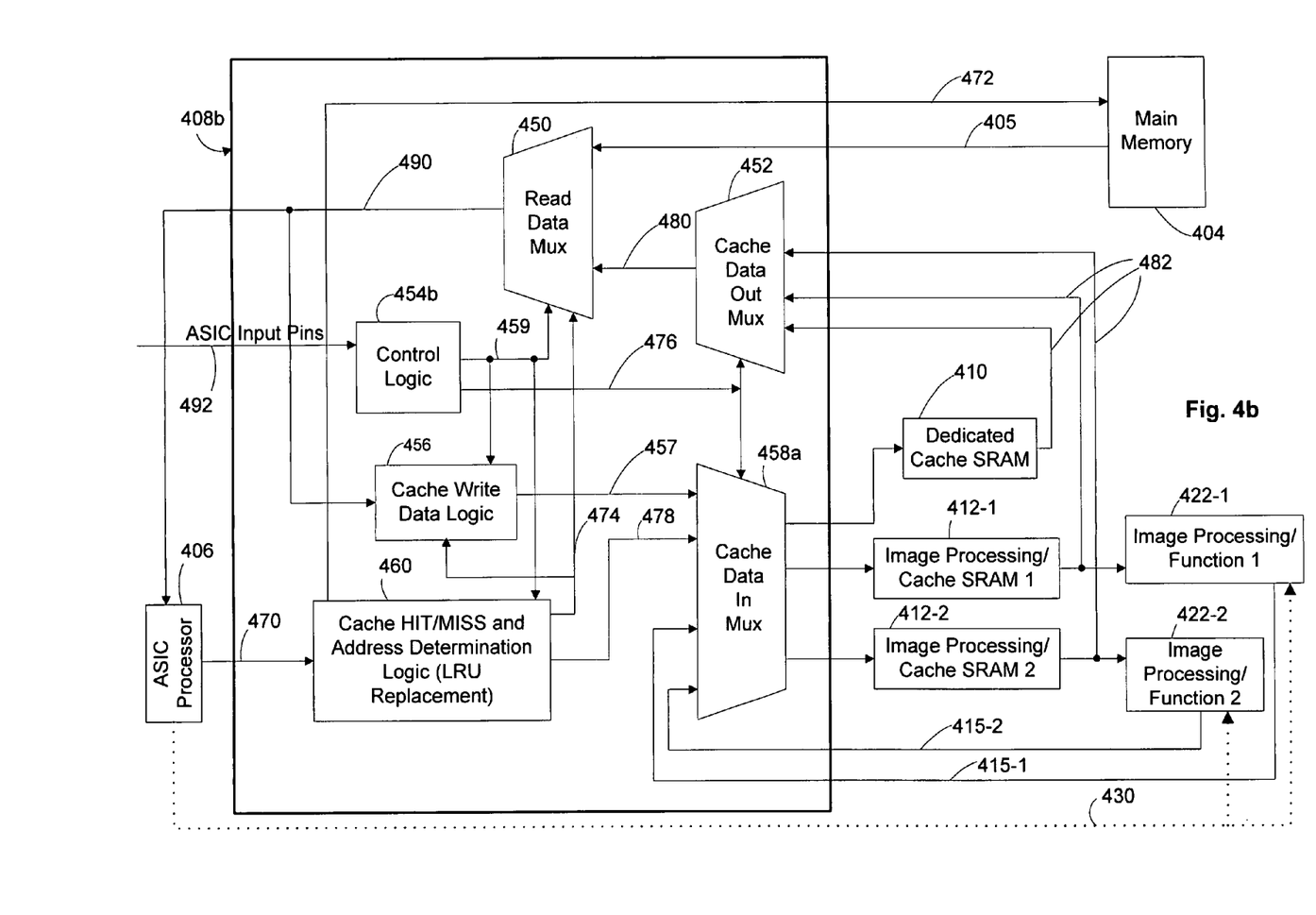
FIG. 4b shows a block diagram similar to that of FIG. 4a in which the ASIC input pins are used to affect control logic.

FIG. 4b shows an ASIC layout similar to that of FIG. 4a, in which one or more ASIC input pins, shown generally as 492, are input to the control logic 454b of the cache controller 408b. In this embodiment, the dotted control line from the processor to the control logic 454b is not included (compare with FIG. 4a) since processor firmware no longer controls the configuration, which now is set up outside the ASIC.

Figure 4C:
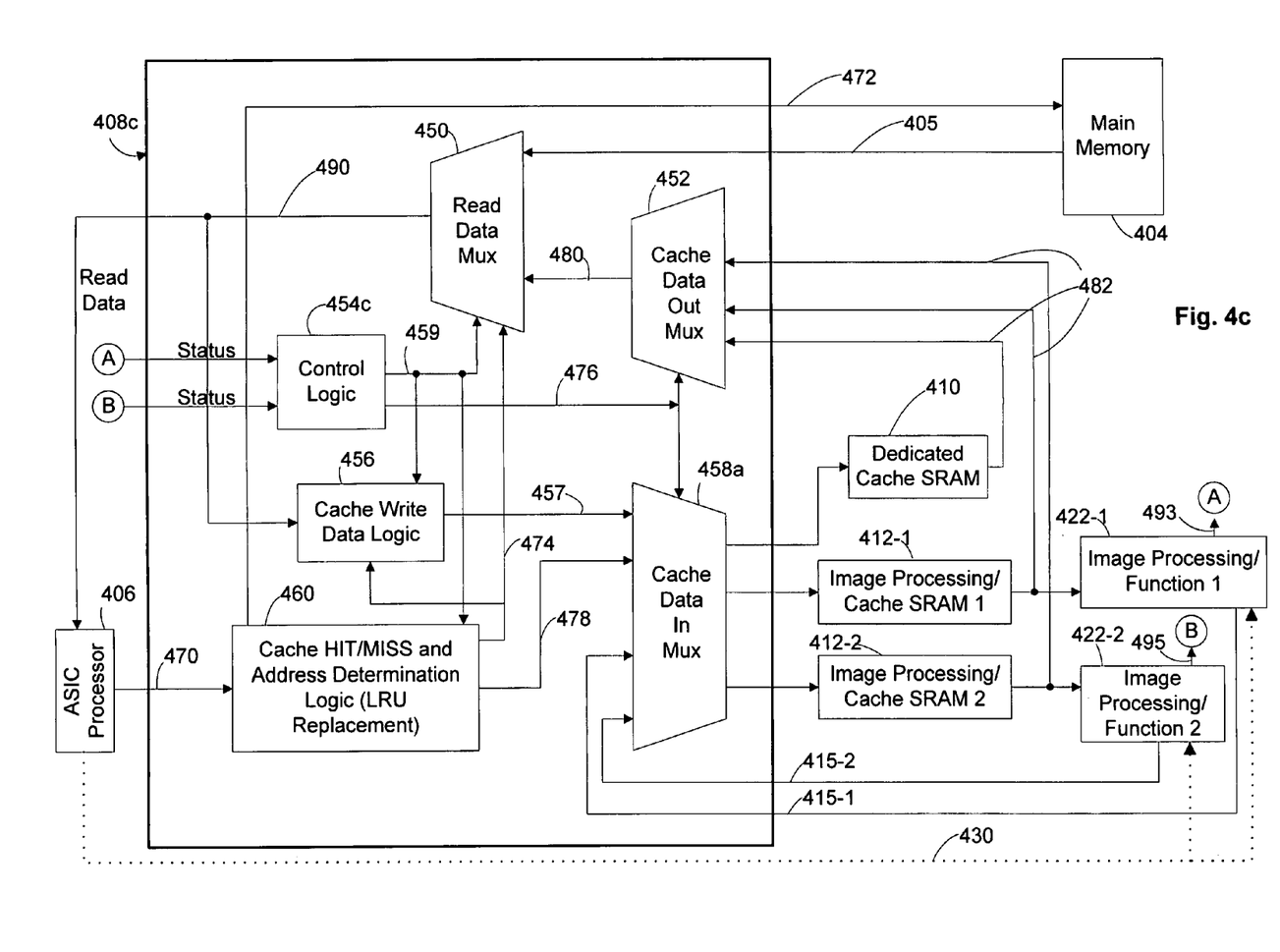
FIG. 4c shows a block diagram similar to that of FIG. 4a in which status signals from the image processing modules are used to affect control logic.

FIG. 4c shows an ASIC layout similar to that of FIG. 4a, in which the cache controller 408c is configured to automatically detect when an image processing module 422, 424 is active and not use the corresponding task-specific SRAM until the function completes its task. As seen in FIG. 4c, the image processing modules 422, 424 output status signals 493, 495, respectively, which indicate to the control logic 454c whether or they are available for use as a cache memory. The control logic 454c, in response to these status signals, is thus able to automatically ascertain, without signaling from the processor, whether the task-specific SRAMs 412-1, 412-2 are available for use as a cache.

Figure 4D:
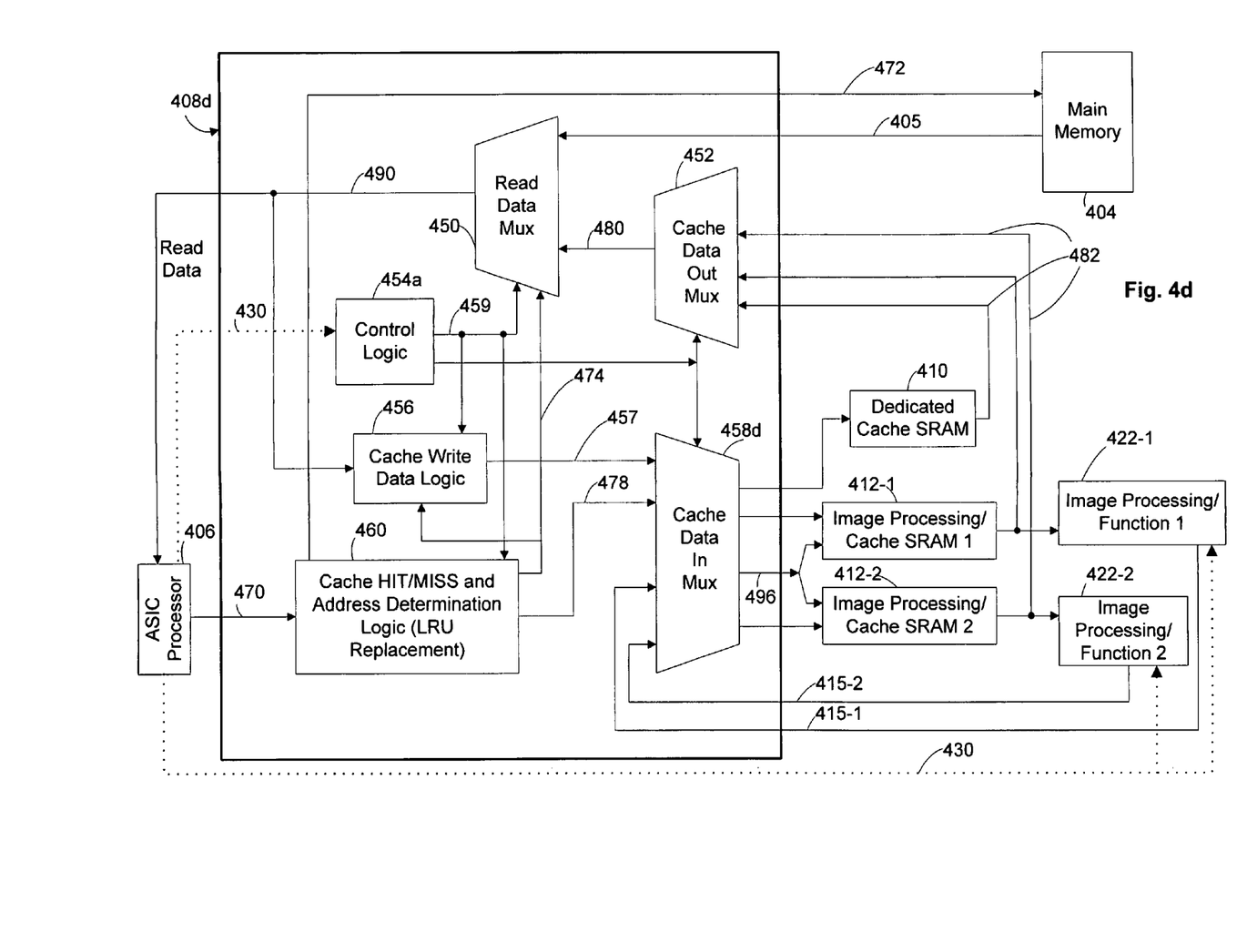
FIG. 4d shows a block-diagram similar to that of FIG. 4a in which two task-specific SRAMS may be used as one contiguous cache memory.

FIG. 4d shows an ASIC layout similar to that of FIG. 4a, in which the cache controller 408d is configured to simultaneously use the first and second task-specific memories 412-1, 412-2 together as a single cache memory. For this, a dual memory control signal 496 is selectively output by the Cache Data In Mux 458d. This allows for a potentially larger cache to be employed than if only one of the task-specific SRAMs 412-1, 412-2 were used as a cache. When both task-specific SRAMs are used as a single cache, each is driven by the same address and control signals. It is noted, however, that the individual connections from Mux 458d to each of the task-specific SRAMs 412-1, 412-2 are still needed because when the SRAMs are used for their normal purpose with their associated image processing modules 422-1, 422-2, respectively, their address/control lines will still be driven separately.

Figure 5:
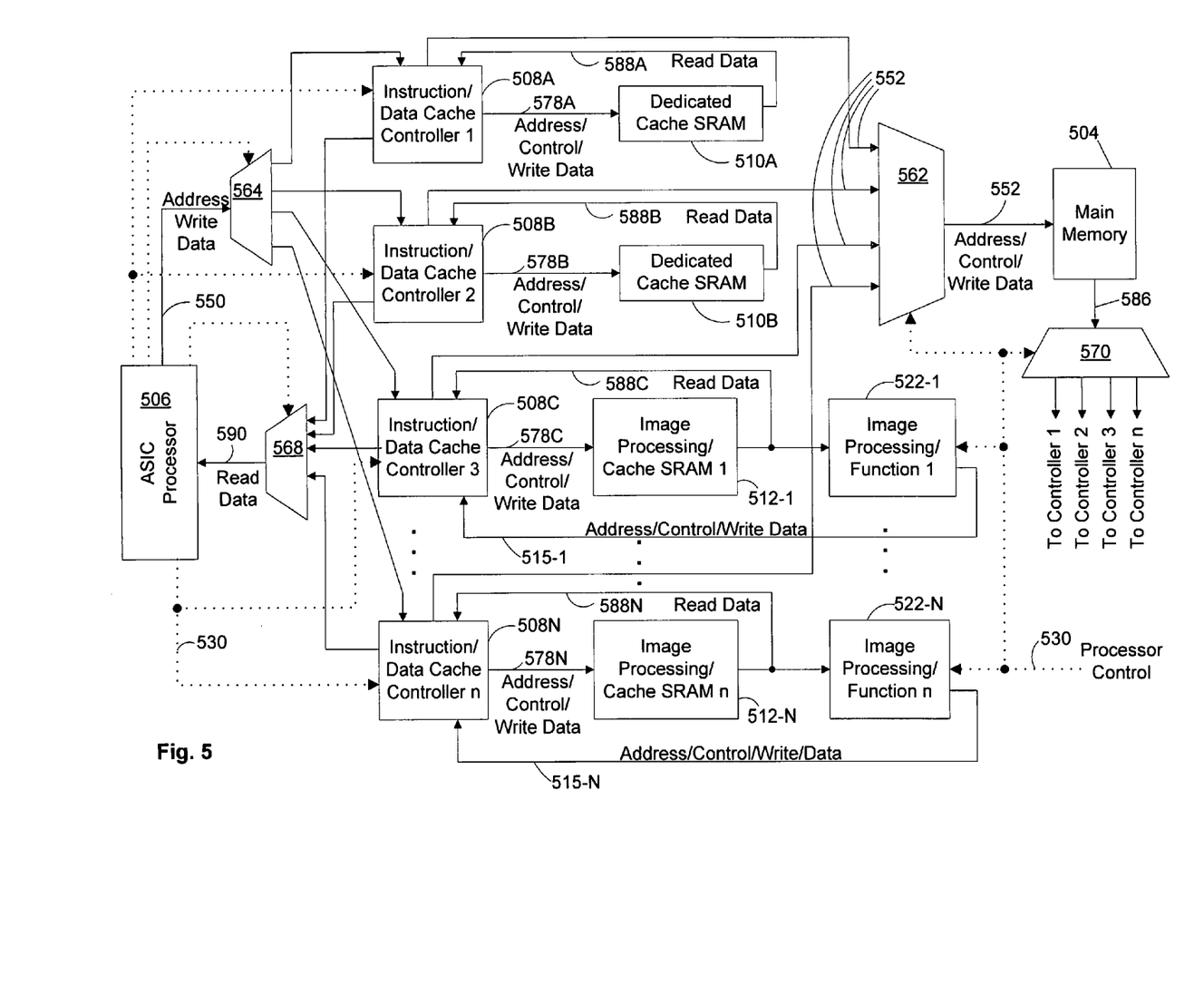
FIG. 5 shows a controller ASIC in accordance with the present invention having multiple cache controllers.

FIG. 5 shows an embodiment of an ASIC having a plurality of dedicated cache SRAMs 510A, 510B and a plurality of task-specific SRAMs 512-1, 512-N, the latter being associated with corresponding image processing modules 522-1, 522-N, respectively. It is understood that while only two task-specific SRAMs are depicted, that any number of such reconfigurable task-specific SRAMs may be provided. As seen in FIG. 5, each of the SRAMs 510A, 510B, 512-1, 512-N has a corresponding cache controller 508A, 508B, 508C, 508N, respectively. Furthermore the various cache controllers need not be identical. For instance, the cache controllers may differ in replacement schemes, numbers of sections, section sizes and other parameters.

The processor 506 is selectively connected to the various cache controllers via a first Mux 564, a given cache controller being specified by control signals 530 (shown in dotted line) from the ASIC processor 506. The processor 506 issues a main memory address 550 from which instructions or data are to be retrieved. Each cache controller determines whether there is a hit or miss and reports this to the processor 506. If more than one reports a hit, the processor selects one in accordance with a priority scheme, and that selected cache controller retrieves the requested information.

If a hit is detected, the selected cache controller presents the corresponding cache address 578A, 578B, 578C or 578N to its associated SRAM 510A, 510B, 512-1, 512-N, respectively. The cache read information 588A, 588B, 588C, 588N is then returned to that cache controller which then forwards the read information 590 to the processor 506 via Mux 568.

If, however, a miss is detected, the selected cache controller presents the memory address 552 via Mux 562 to the main memory 504. The main memory read information 586 is then sent back to the requesting cache controller 508A-508N via Mux 570. The requesting cache controller 508A-508N then forwards this read information 590 to the processor 506 via Mux 568. In addition, the requesting cache controller 508A-508D writes the retrieved information to its corresponding SRAM 510A, 510B, 512-1, 512-N, respectively.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. An application specific integrated circuit (ASIC) comprising:
    a processor;
    a first module configured to perform a first task when the first module is active;
    a first task-specific memory that is used only by said first module when performing said first task;
    a dedicated cache memory that is physically distinct from and non-contiguous to the first task-specific memory; and
    a cache controller connected to said first task-specific memory and configured to employ the first task-specific memory as the processor's cache memory, when said first module is not active, and to employ the dedicated cache memory as the processor's cache memory when said first module is active;
    wherein the dedicated cache memory is disabled from any use while the first task-specific memory is employed as the processors' cache memory.

2. The application specific integrated circuit according to claim 1, wherein the cache controller is reconfigurable by firmware.

3. The application specific integrated circuit according to claim 1, wherein the cache controller is reconfigurable by one or more ASIC input pins.

4. The application specific integrated circuit according to claim 1, wherein the cache controller is automatically reconfigurable by one or more status signals from the first module.

5. The application specific integrated circuit according to claim 1, wherein the first task-specific memory is physically isolated from said dedicated cache memory.

6. The application specific integrated circuit according to claim 1, wherein the first task-specific memory is larger in size than said dedicated cache memory.

7. The application specific integrated circuit according to claim 1, further comprising:
    a second module configured to perform a second task when the second module is active; and
    a second task-specific memory that is physically distinct from and non-contiguous to the first task-specific memory and used only by said second module when performing said second task; wherein:
    the cache controller is connected to said second task-specific memory and is further configured to employ the second task-specific memory as the processor's cache memory, when said first module is active and the second module is not active, the dedicated cache memory being employed at the processor's cache memory only when the first and second modules are active.

8. The application specific integrated circuit according to claim 7, wherein the cache controller is configured to simultaneously use the first and second task-specific memories together as a single cache memory.

9. The application specific integrated circuit according to claim 7, wherein the first and second task-specific memories are both larger in size than said dedicated the cache memory.

10. The application specific integrated circuit according to claim 7, wherein the first task-specific memory, the second task-specific memory and the dedicated cache memory are all mutually non-contiguous.

11. The application specific integrated circuit according to claim 1, comprising:
    a plurality of cache controllers and an equal plurality of task-specific memories that are capable of serving as cache memories, wherein each of said plurality of task-specific memories is controlled by a corresponding one of said cache controllers.

12. The application specific integrated circuit according to claim 11, wherein at least two of said plurality of cache controllers differ from one another in one or more of replacement schemes, numbers of sections and section sizes.

13. An application specific integrated circuit (ASIC) comprising:
    a processor;
    a first dedicated cache memory accessible by the processor and usable only as a cache memory by that processor, the first dedicated cache memory having a first size;
    a first module configured to perform a first task when the first module is active;
    a first task-specific memory that is used only by said first module when performing said first task and that is physically distinct from and non-contiguous to the first dedicated cache memory, and having a second size larger than the first size; and
    a cache controller connected to both the first dedicated cache memory and to the first task-specific memory, wherein:
        the first task-specific memory is reconfigurable by the cache controller to be employed as a cache memory when said first module is not active so that the processor has access to a cache memory having a size larger than that of the dedicated cache memory;
    wherein the dedicated cache memory is disabled from any use while the first task-specific memory is employed as the processors' cache memory.

14. The application specific integrated circuit according to claim 13, further comprising:
    a second module configured to perform a second task when the second module is active; and
    a second task-specific memory physically distinct from the dedicated cache memory and the first-task specific memory and having a third size larger than the first size, wherein the second task-specific memory is reconfigurable as a cache memory when said first module is active and said second module is not active, so that the processor has access to a cache memory having a size larger than that of the dedicated cache memory.

15. The application specific integrated circuit according to claim 14, wherein the second task-specific memory has a size smaller than that of the first task-specific memory.

16. The application specific integrated circuit according to claim 14, wherein the first task-specific memory, the second task-specific memory and the dedicated cache memory are all mutually non-contiguous.

17. The application specific integrated circuit according to claim 14, wherein the cache controller is configured to simultaneously use the first and second task-specific memories together as a single cache memory.

18. The application specific integrated circuit according to claim 13, wherein the cache controller is reconfigurable by firmware.

19. The application specific integrated circuit according to claim 13, wherein the cache controller is reconfigurable by one or more ASIC input pins.

20. The application specific integrated circuit according to claim 13, wherein the cache controller is automatically reconfigurable by one or more status signals from the first module.

21. A method of designating a current cache memory in an application specific integrated circuit (ASIC) that has a dedicated cache memory, a first module configured to perform a first task when the first module is active, a second module configured to perform a second task when the second module is active, a first task-specific memory that is used only by said first module when performing said first task and a second task-specific memory that is physically distinct from and non-contiguous to the first task-specific memory and used only by said second module when performing said second task, both the first and second task-specific memories having a size larger than that of the dedicated cache memory with the first task-specific memory having a size larger than a size of the second task-specific memory, wherein said dedicated cache memory is physically distinct from and non-contiguous to the first task-specific memory, the method comprising:

determining whether the first module is active;

if the first module is not active:

enabling the first task-specific memory to serve as the current cache memory;

if the first module is active:

determining whether the second module is active;

if the second module is not active:

enabling the second task-specific memory to serve as the current cache memory; and         if the second module is active:

enabling the dedicated cache memory to serve as the current cache memory;

wherein the dedicated cache memory is disabled from any use while one of the first and second task-specific memories is enabled to serve as the current cache.

22. The method according to claim 21, further comprising enabling the first task-specific memory to serve as the current cache when the first module is not active.

23. An application specific integrated circuit (ASIC) comprising:

a processor;

a dedicated cache memory accessible by the processor;

a first module configured to perform a first task when the first module is active;

a first task-specific memory physically distinct from the dedicated cache memory and that is used only by said first module when performing said first task; and     a cache controller connected to said dedicated cache memory and said first task-specific memory, said cache controller being configured to disable the dedicated cache memory and employ the first task-specific memory as the processor's cache memory, when said first module is not active, the disabled dedicated cache memory being disabled from any use while disabled.

24. The method of claim 21, further comprising:

disabling an enabled task-specific memory from serving as the current cache memory responsive to receipt of a new task which requires the enabled task-specific memory.

\* \* \* \* \*